Feb. 28, 1967  A. P. LANZON ETAL  3,305,961
PORTABLE ILLUMINATED SIGNAL FLAG
Filed March 23, 1966
FIG. 1.
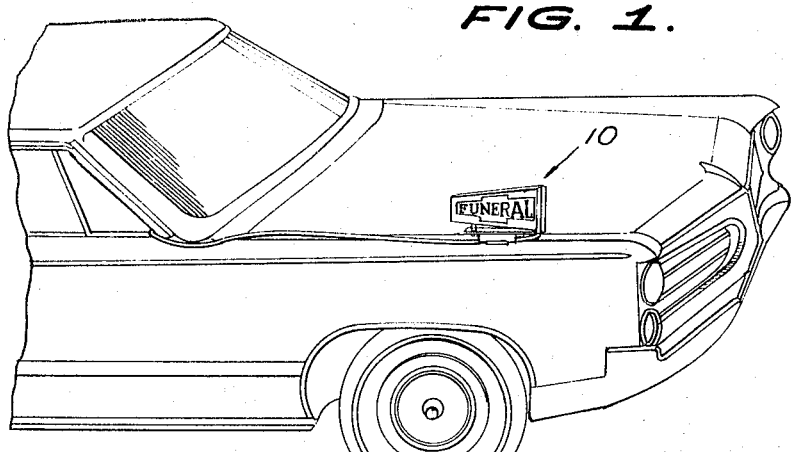
FIG. 2.  FIG. 3.  FIG. 4.
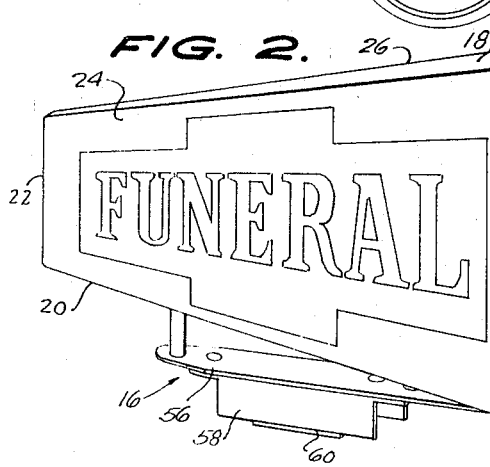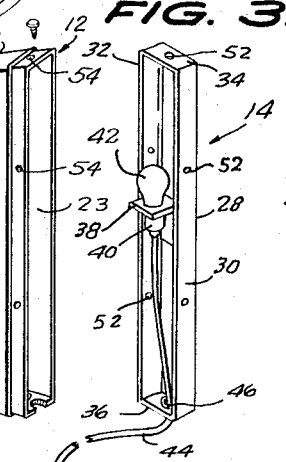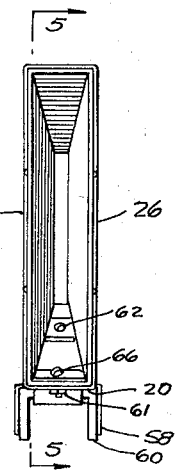
FIG. 5.
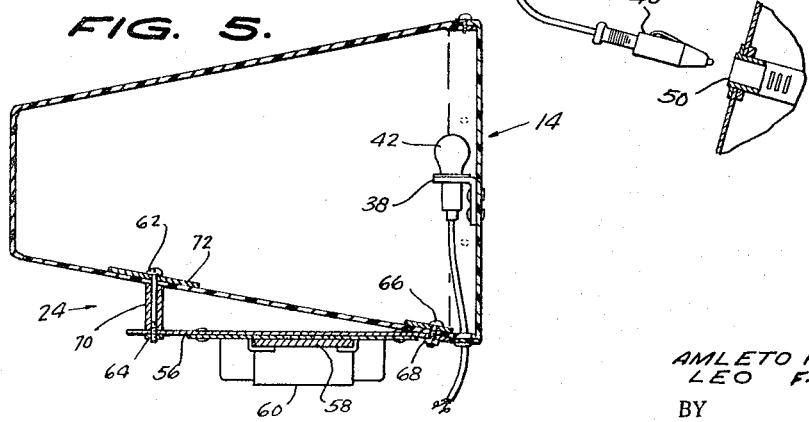
INVENTORS.
AMLETO P. LANZON,
LEO F. LANZON,
BY
Fidelman & Wolffe.
ATTORNEYS.

United States Patent Office 3,305,961
Patented Feb. 28, 1967

3,305,961
PORTABLE ILLUMINATED SIGNAL FLAG
Amleto P. Lanzon and Leo F. Lanzon, both of
401 W. 8 Mile Road, Detroit, Mich. 48203
Filed Mar. 23, 1966, Ser. No. 536,682
4 Claims. (Cl. 40—129)

This invention relates to new and useful improvements in safety signal and warning devices for motor vehicles and more particularly to a portable illuminated signal flag to be placed on a vehicle to warn other drivers to give the right-of-way to the vehicle or to indicate that the vehicle is disabled.

It is common practice for doctors, volunteer firemen, and others using their cars in an emergency to rely on their headlights to signal other vehicles that they are on an emergency call and must be given the right-of-way. At night of course it is necessary for the emergency vehicle drivers to constantly blink their headlights or use their horns to distinguish their car from the other vehicles on the road. Also in the case of cars in a funeral procession, the procedure is for these cars to use their headlights and to keep in line to warn other drivers not to cut into the procession and to allow the complete procession to pass through an intersection.

However, this procedure of relying on headlights alone creates a very dangerous situation since many drivers do not realize that a car with its headlights on should be given the right of way. This forces the emergency vehicle to pass and cut in and out of traffic lanes at high speeds thereby endangering the life of the driver and others. Furthermore, with the growing trend of many drivers to use their headlights at all times as a safety means, the use of headlights to signify an emergency vehicle or an automobile in a funeral procession is rapidly losing its significance as a signalling device. Also, with the increasingly heavy traffic on the roads, it is becoming more difficult to distinguish a funeral procession from the normal line of moving cars.

A primary object of this invention is to provide a portable signal for a motor vehicle which will warn others of the special character of the vehicle or to indicate that the vehicle is disabled.

Another object of this invention is to provide a portable illuminated signal flag which can be placed at any location on an automobile.

A further object of this invention is to provide an illuminated signal flag for a vehicle having a flag design to indicate the particular nature of the vehicle and which can be easily removed from the vehicle when no longer required.

Still a further object of the invention is to provide a novel emergency signal device having the mentioned attributes which is simple in construction, reasonable in cost, and which is efficient in carrying out the purposes for which it is designed.

Other objects and advantages will become apparent in the following specification when considered in the light of the attached drawings in which:

FIG. 1 is a perspective view of an automobile and a safety signal flag constructed and arranged in accordance with the present invention and mounted on the front of the car and in operating condition;

FIG. 2 is an enlarged perspective view of the signal flag with the end cover assembly removed;

FIG. 3 is an enlarged perspective view of the end cover assembly;

FIG. 4 is a side elevation of the signal flag with the end cover assembly removed; and FIG. 5 is a longitudinal vertical section taken along the line 5—5 of FIG. 4 looking in the direction of the arrows.

Referring now to the drawings in detail wherein like reference characters indicate like parts throughout the several figures, the reference numeral 10 indicates generally a lighted signal flag constructed in accordance with the invention.

The signal flag 10 comprises a generally trapezoidal flag shaped body portion, generally designated 12, an end cover assembly, generally designated 14, and a mounting assembly, generally designated 16.

The flag shaped body portion 12 comprises a top wall 18, a bottom wall 20, an end wall 22, an open end 23, a front panel 24, and a rear panel 26. As shown in FIGS. 2 and 4, the panels 24, 26 converge slightly toward end wall 22 to give more of a flaglike appearance. However, the panels 24, 26 can be constructed parallel to each other as well. The flag shaped body 12 is preferably fabricated from translucent Plexiglas although other suitable plastic materials or glass can be utilized. The panels 24, 26 have indicia placed thereon such as shown in FIGS. 1 and 2. The indicia may be placed on the panels by any suitable method such as painting, decaling or silk screening. The indicia as shown is for motor vehicles in a funeral procession; however, the flag can be made with other designs indicating other emergency or distress purposes. For example, indicia such as firemen, police, M.D., Red Cross, or the use of colors alone such as a red flag to indicate a disabled vehicle are contemplated.

The end cover assembly 14 includes a rectangularly shaped body preferably formed of translucent Plexiglas having an end wall 28, a front wall 30, a rear wall 32, a top wall 34, and a bottom wall 36. Attached to end wall 28 is a light support bracket 38 having a light socket 40 secured thereon with a light 42 positioned therein. A wire 44 extends through an opening 46 in the bottom wall 36 terminating in means to connect into the electrical system of the automobile. As illustrated, said means is a plug 48 of any manufacturer's make to be inserted in a cigarette lighter 50 of the automobile. The end cover assembly 14 has openings 52 which are formed to align with openings 54 in flag body 12. Suitable fastening means are inserted into openings 52, 54 to retain the end cover assembly 14 on the flag body portion 12.

The mounting assembly 16 comprises a support bracket 56, a magnetic shield 58 attached to bracket 56, and a U-shaped magnet 60 attached to shield 58. To protect the car surfaces, the magnet 60 may be coated with a suitable protective film (not shown). By the use of a magnet, the flag can be easily retained in position on and at any location on the automobile without the necessity of any modifications to the automobile. The support bracket 56 is connected to flag body portion 12 with a bolt 62 and nut 64 at one end and a bolt 66 and nut 68 at the other end. A spacer 70 is used with bolt 62 to keep the flag body 12 supported at the proper angle. A reinforcing plate 72 may be utilized within the flag body portion 12 to strengthen that part of bottom wall 20 upon which bolt 62 presses.

As can be seen, there has been described an illuminated vehicle signal flag which can be rapidly put into use by placing the flag on a vehicle and plugging the light into the vehicle cigarette lighter, thereby signalling pedestrians and vehicles alike of the special character of the vehicle exhibiting this flag.

While the forms of apparatus herein described constitute preferred embodiments of the invention, it is to be understood that the invention is not to be limited to this precise form of apparatus and that changes may be made therein without departing from the scope of the invention which is defined in the appended claims.

What is claimed is:

1. A portable illuminated signal flag for motor vehicles comprising a housing, illuminating means attached to the housing, and means for mounting said housing onto the motor vehicle, said housing comprising a body portion and an end cover assembly, said body portion including an end wall, a top wall, a bottom wall, and a pair of side panels with at least one of said side panels being an indicia carrying translucent panel, said end cover assembly being attached to said body portion on the end of said body portion opposite from said end wall, said end wall and said end cover assembly being substantially vertical when said signal flag is in a position of use on said motor vehicle, said end cover assembly having a longitudinal dimension substantially greater than said end wall longitudinal dimension, said mounting means including a mounting bracket attached to said bottom wall of said body portion at spaced apart locations and magnetic means attached to said mounting bracket for detachably securing said housing to a motor vehicle, said mounting means including means to space said housing from said mounting bracket whereby said end wall and said end cover assembly are maintained in said vertical position on said motor vehicle giving a flag-like appearance to said housing.

2. The illuminated signal flag of claim 1 wherein said side panels are trapezodial in shape with each of said panels being an indicia carrying translucent panel.

3. The illuminated signal flag of claim 1 wherein said end cover assembly includes means to support said illuminating means.

4. The illuminated signal flag of claim 1 wherein said illuminating means includes a light mounted in said housing and means extending from the light for electrically and detachably connecting said light to a selected socket on said motor vehicle.

References Cited by the Examiner

UNITED STATES PATENTS

| | | | |
|---|---|---|---|
| 2,007,585 | 4/1937 | Rivers | 40—129 |
| 2,579,653 | 12/1951 | Dawley | 240—8.18 |
| 2,831,960 | 4/1958 | Heiser | 240—7.1 |
| 2,960,786 | 11/1960 | Wagner | 40—142 X |
| 3,242,329 | 3/1966 | Abrams | 240—7.1 |

EUGENE R. CAPOZIO, *Primary Examiner.*

S. M. BENDER, ROBERT W. WEIG,
*Assistant Examiners.*